United States Patent
Pavlovic et al.

(10) Patent No.: US 6,588,322 B2
(45) Date of Patent: Jul. 8, 2003

(54) HOUSEHOLD APPLIANCE

(75) Inventors: Henrik Pavlovic, Ljubno Ob Savinji (SI); Igor Zibret, Smartno Ob Paki (SI)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/260,324

(22) Filed: Sep. 30, 2002

(65) Prior Publication Data
US 2003/0066437 A1 Apr. 10, 2003

Related U.S. Application Data

(63) Continuation of application No. PCT/EP01/02179, filed on Feb. 26, 2001.

(30) Foreign Application Priority Data

Mar. 31, 2000 (DE) .......................... 100 16 303

(51) Int. Cl.⁷ .............. A23L 1/00; A47J 43/04; A47J 44/00; B01F 13/04; B02C 23/04
(52) U.S. Cl. .............. 99/331; 99/337; 99/348; 99/492; 366/144; 366/601; 366/206
(58) Field of Search .......................... 99/326–333, 337, 99/348, 338, 484–486, 489, 492, 495, 509–513; 210/380.1, 360.1; 241/37.5, 73, 92, 86.1, 89.3, 282.2, 282.1, 261.1, 101.2, 199.12; 366/144–149, 205, 206, 601, 96–98, 197, 199; 219/492, 494, 497, 521; 494/36, 43, 56, 58; 426/61, 63, 49, 52, 533, 523, 599

(56) References Cited

U.S. PATENT DOCUMENTS

| | | | | |
|---|---|---|---|---|
| 3,612,126 A | * | 10/1971 | Emmons et al. | 366/205 X |
| 3,809,325 A | * | 5/1974 | Marrie | 99/331 X |
| 4,269,519 A | * | 5/1981 | Birr | 99/348 X |
| 4,568,193 A | * | 2/1986 | Contri et al. | 366/206 |
| 4,681,030 A | * | 7/1987 | Herbert | 99/484 |
| 4,921,174 A | * | 5/1990 | Okada et al. | 366/601 X |
| 4,921,175 A | * | 5/1990 | Okada et al. | 99/348 X |
| 4,941,403 A | * | 7/1990 | Cimenti | 99/510 X |
| 5,031,518 A | * | 7/1991 | Bordes | 99/331 X |
| 5,184,893 A | * | 2/1993 | Steele et al. | 366/209 |
| 5,353,697 A | * | 10/1994 | Venturati et al. | 99/348 X |
| 5,556,198 A | * | 9/1996 | Dickson, Jr. et al. | 366/601 |
| 5,567,049 A | * | 10/1996 | Beaudet et al. | 366/206 X |
| 5,779,358 A | | 7/1998 | Bevington | |

FOREIGN PATENT DOCUMENTS

| | | |
|---|---|---|
| FR | 1.201.685 | 1/1960 |
| FR | 2 265 332 | 10/1975 |
| GB | 834764 | 5/1960 |

\* cited by examiner

Primary Examiner—Timothy F. Simone
(74) Attorney, Agent, or Firm—Laurence A. Greenberg; Werner H. Stemer; Ralph E. Locher

(57) ABSTRACT

A household appliance, in particular, a food processor, includes a housing with at least two housing parts joined together, and in which there is an electric operating element, of which an electric circuit has a control member actuated by an actuating element disposed on the outside of the housing. Because the control member is fastened on a carrier part disposed in a floating manner directly or indirectly on the one housing part, at least one aligning element is provided on the other housing part that, when the housing parts are joined together, comes into engagement with a mating aligning element provided on the carrier part. The aligning element on the other housing part is aligned to an installation opening provided thereon for mounting the actuating element. Improved thereby is production of the electrical connections between the operating element and the control member and coupling the actuating element to the control member.

17 Claims, 3 Drawing Sheets

HOUSEHOLD APPLIANCE

CROSS-REFERENCE TO RELATED APPLICATION

This application is a continuation of copending International Application No. PCT/EP01/02179, filed Feb. 26, 2001, which designated the United States and was not published in English.

BACKGROUND OF THE INVENTION

Field of the Invention

The invention relates to a household appliance, in particular, a food processor, which has a housing including at least two housing parts that can be joined together and in which there is installed an electric operating element, of which the electric circuit contains a control member that can be actuated by an actuating element disposed on the outside of the housing.

Household appliances, for example, food processors, usually have a housing with two housing parts that can be joined together. A drive motor is disposed on the one housing part (bottom housing part), for example, as an operating element, and an actuating knob or toggle is disposed on the other housing part (top housing part) for the purpose of actuating a switch disposed as a control member in the circuit of the drive motor. Such a switch may be disposed, in spatial terms, either on the bottom housing part, or on the outside of the drive motor fitted on the bottom housing part, or else on the inside of the top housing part. In the latter case, there are certain difficulties in respect of producing the electrical connections between the switch and the drive motor. In the other case, although it is easy to produce, the electrical connections between the drive motor and the switch, on account of their immediate proximity to one another, the task of coupling the actuating knob or toggle to the switch results in problems due to tolerance deviations present when the housing parts are joined together.

SUMMARY OF THE INVENTION

It is accordingly an object of the invention to provide a household appliance that overcomes the hereinaforementioned disadvantages of the heretofore-known devices of this general type and that has no difficulties either with respect to the electrical connection of the control member located in the circuit of the operating element or with respect to coupling the actuating element mechanically to the control member.

With the foregoing and other objects in view, there is provided, in accordance with the invention, a household appliance, including a housing having an outside surface, an actuating element disposed on the outside surface, at least two housing parts joined together, one of the housing parts having a carrier part one of directly and indirectly disposed on the one housing part in a floating manner, the carrier part having a mating aligning element, another of the housing parts having a surface defining an installation opening, at least one aligning element engaging the mating aligning element when the at least two housing parts are joined together, and the at least one aligning element being disposed with respect to the installation opening to mount the actuating element to the at least one aligning element, and an electric operating element disposed in the housing and having an electric circuit with a control member connected to and actuated by the actuating element, the control member connected to the carrier part. Wherein the appliance is a food processor.

According to the invention, the control member is fastened on a carrier part disposed in a floating manner directly or indirectly on the one housing part. Provided on the other housing part is at least one aligning element that, when the housing parts are joined together, comes into engagement with a mating aligning part provided on the carrier part. The aligning element on the other housing part is positioned in relation to an installation opening provided on such housing part for the purpose of fitting the actuating element. Placing the control member on the one housing part makes it possible easily to produce the electrical connections between the control member and the operating element fitted on the same housing part. When the housing parts are joined together, the aligning element, which is fitted on the other housing part, in conjunction with the mating aligning element, provided on the carrying part, aligns the carrier part correspondingly. The corresponding positioning of the aligning element in relation to the installation opening for the actuating element, then, ensures that the control element passes into a position coinciding with the spatial position of the actuating element. It is, thus, also the case that the task of coupling the actuating element to the control member does not present any difficulties.

In accordance with another feature of the invention, corresponding alignment of the carrier part is ensured respectively by placing the carrier part on the one housing part in a resilient manner in the plug-on direction of the other housing part and such that it can be displaced in the direction that is offset through 90° in relation to the plug-on direction. As a result of the resilient suspension of the carrier part, the carrier part may be disposed on the one housing part such that, when the two housing parts are joined together, the aligning element and mating aligning element reliably engage and the carrier part, thus, moves into a position in relation to the other housing part that is defined by the aligning element of such housing part. This, then, also defines the position of the actuating element, which can be inserted into the installation opening, in relation to the control member, which is disposed on the carrier part.

In accordance with a further feature of the invention, the at least two housing parts are joined in a joining direction and the carrier part is floatingly fastened to the one housing part to deflect elastically at least in the joining direction.

In accordance with an added feature of the invention, a particularly expedient configuration of the aligning and mating aligning elements is achieved by providing a shaft on the carrier part as a mating aligning element. The shaft has run-in slopes and is positioned in relation to the control member disposed on the carrier part. Also provided on the other housing part as an aligning element is a nose-like strip that fits into the shaft. The run-in slopes ensure that, despite dimensional deviations, these elements come into contact with one another when the housing parts are joined together.

In accordance with an additional feature of the invention, there are provided pin-like protrusions, on the carrier part as further mating aligning elements, projecting out of the plane of the carrier part and likewise positioned in relation to the position of the control member. Provided on the other housing part are obliquely running strips that, when the two housing parts are joined together, engage in an arrow-like manner between the pin-like protrusions and slide along the latter. The further mating aligning elements also allow relatively high adjusting forces to be dealt with.

In accordance with yet another feature of the invention, an embodiment that is particularly suitable for adjustment both in the horizontal and in the vertical directions is characterized in that the carrier part has at least three carrying arms with a resilient configuration in the plug-on direction of the other housing part and that are fastened on the one housing part such that they can be displaced in the direction that is offset through 90° in relation to the plug-on direction.

Because a printed circuit board containing the control member is fitted on the carrier part, it is also possible for the components that are necessary for controlling or regulating the electric operating element to be placed at a suitable location that does not require any further wiring outlay.

In accordance with yet a further feature of the invention, the electric operating element is one of the group consisting of a motor and heating coils. If a drive motor is provided as the operating element, then the carrier part may advantageously be disposed on the outside of the drive motor.

In accordance with yet an added feature of the invention, it is advantageous from construction standpoints to provide, on the other housing part, a separate component that serves as an aligning element and is aligned in its position on the other housing part in the direction of the installation opening for the actuating element. Such a component of relatively complicated configuration can be produced considerably more easily independent of the housing, and need, then, just be installed on the housing. Such installation can take place, in turn, without high outlay by retaining the component in the installation opening with corresponding latching elements.

Tolerance deviations have less effect on the task of coupling the actuating element to the control member in that the actuating element can be connected directly to the component in the installation opening from the outside of the housing. As such, dimensional deviations in respect of fitting the component on the other housing part have no effect when the actuating element is coupled to the control member.

In accordance with yet an additional feature of the invention, the actuating element has a latching connection connecting the actuating element to the at least one aligning element.

Because the actuating element can be connected to the component by a latching connection, straightforward installation of the actuating element, which requires little outlay, is possible.

In accordance with a concomitant feature of the invention, the control member is a switch.

Other features that are considered as characteristic for the invention are set forth in the appended claims.

Although the invention is illustrated and described herein as embodied in a household appliance, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
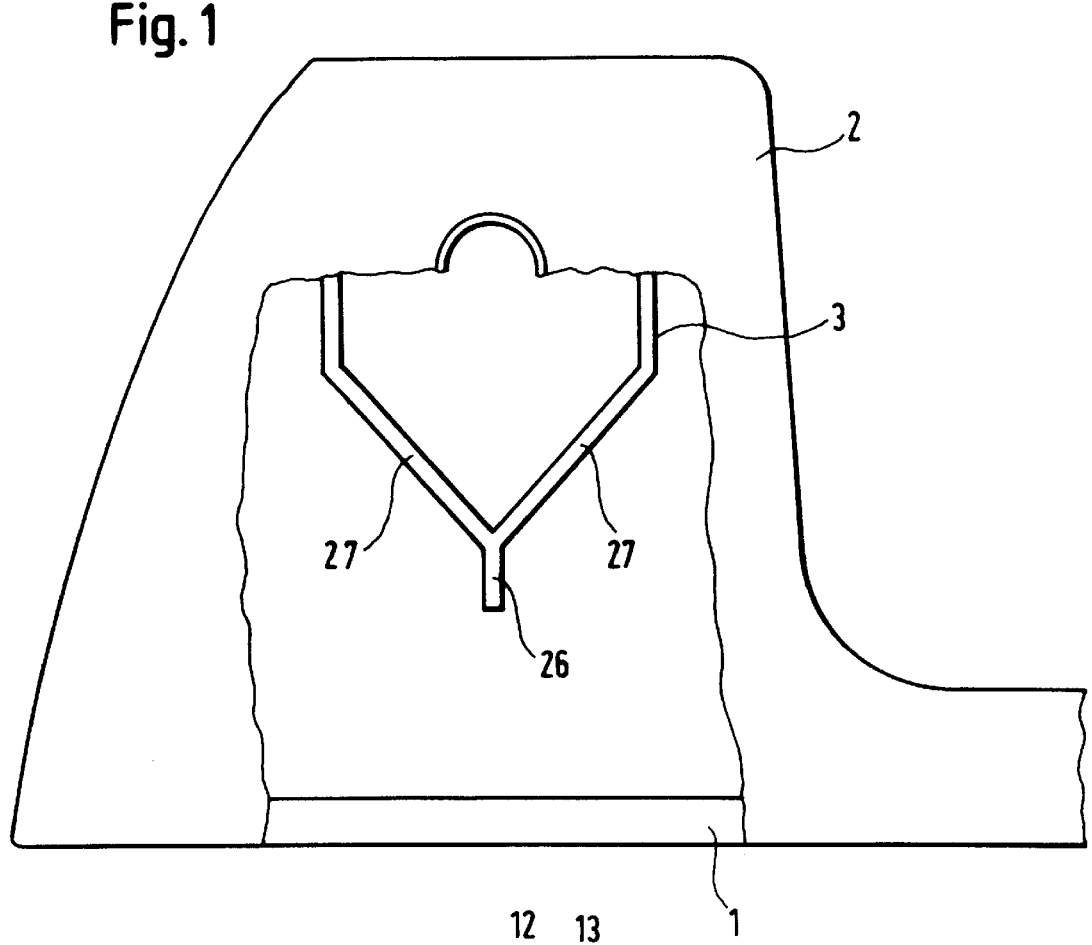
FIG. 1 is a fragmentary, partially cut-away, elevational side view of an aligning element configuration on a housing part according to the invention.

Referring now to the figures of the drawings in detail and first, particularly to FIG. 1 thereof, there is shown one housing part 1 (bottom housing part) of a food processor. To complete the housing of the food processor, another housing part 2 (top housing part) is placed in position on the bottom housing part 1 and is connected to the bottom housing part 1. An aligning element 3 that is more or less in the form of a Y in the bottom region thereof is fitted on the top housing part 2. The aligning element 3 is configured as a separate component and is fastened on the top housing part 2.

Figure 3:
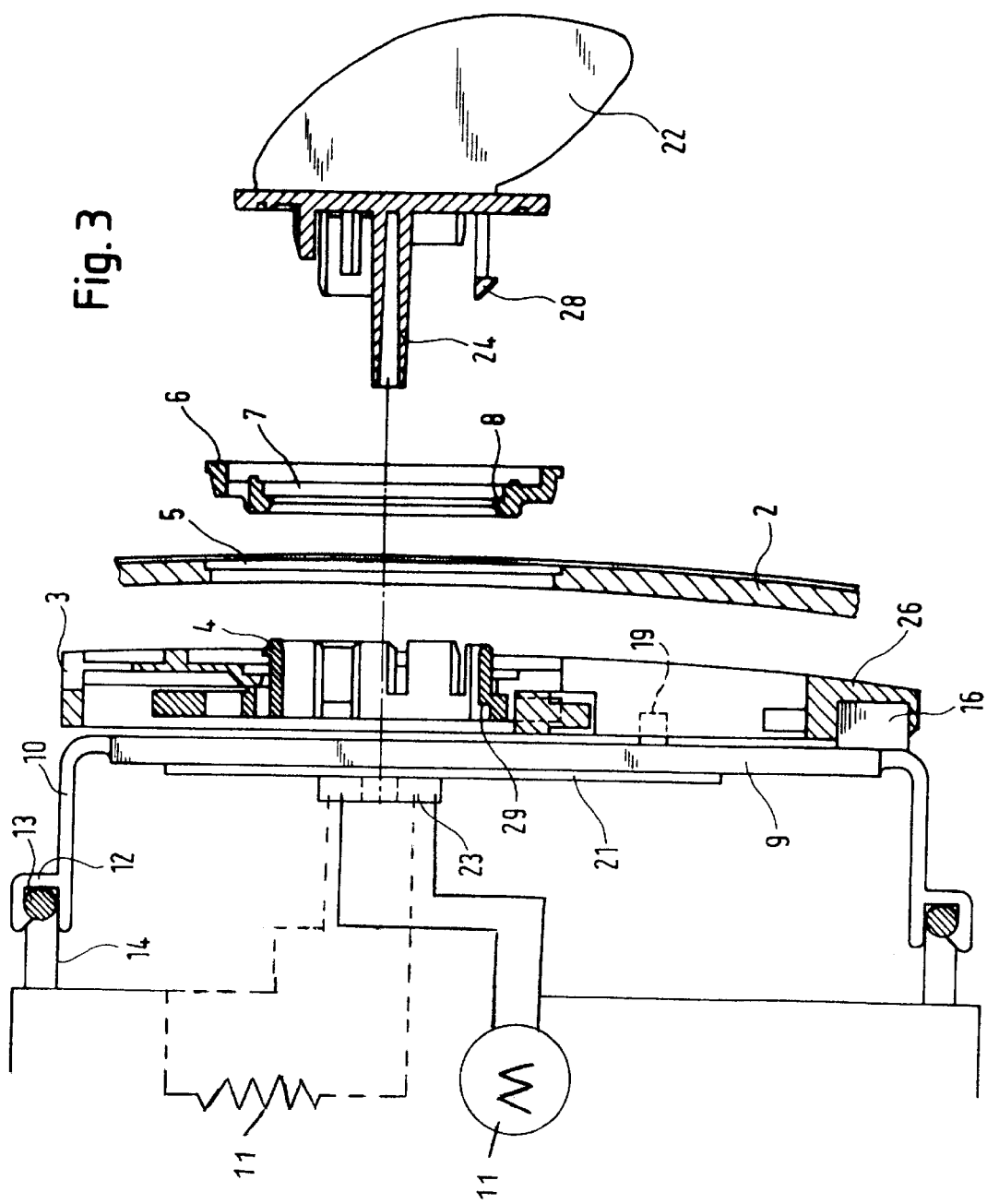
FIG. 3 is an fragmentary, exploded cross-sectional view of the aligning element of FIG. 1 with the carrier part of FIG. 2.

Provided on the aligning element 3 are projecting latching noses 4 that can be introduced into an installation opening 5 of the top housing part 2. See FIG. 3. The aligning element 3 is, then, fastened on the top housing part 2 by an installation ring 6, which can be latched to the latching noses 4 by way of a latching edge 8 running around the inner opening 7 of the installation ring 6. On its outer circumference, the installation ring 6 has an outer contour that matches the contour of the inner circumference of the installation opening 5. Once the installation ring 6 has been latched to the latching noses 4, the installation ring 6 butts against the installation opening 5 and, thus, retains the aligning element 3 on the top housing part 2.

Figure 2:
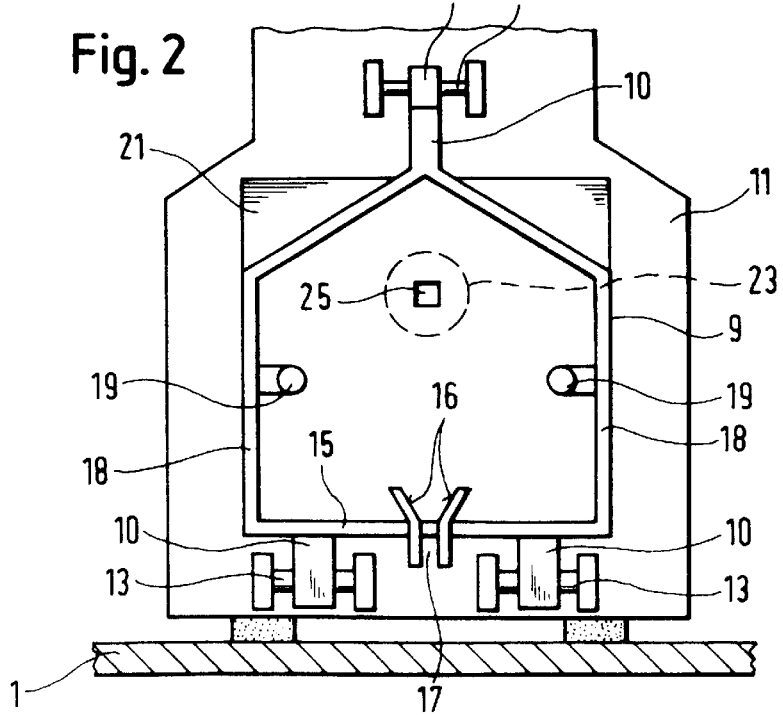
FIG. 2 is a fragmentary, sectional plan view of a carrier part on a drive motor of a food processor according to the invention.

A frame-shaped carrier part 9 is fastened by resilient carrying arms 10 on a drive motor 11 connected to the bottom housing part 1. The carrier part 9 is, thus, connected indirectly to the bottom housing part 1. Depending on the configuration of the appliance, the carrier part 9 may also be fitted directly on the bottom housing part 1. The carrying arms 10, for such a purpose, are each snap-connected, by way of a claw 12 formed at their free end, onto the U-leg 13 of a U-shaped hook 14 projecting on the outside of the drive motor 11. See FIGS. 2 and 3. The length of the U-leg 13 is greater than the width of the claw 12. As a result, the carrying arms 10 can be displaced in the horizontal direction on the U-leg 13.

A shaft 17 provided with run-in slopes 16 is integrally formed on the bottom transverse bar 15 of the carrier part 9. Provided on the two lateral, vertically running bars 18 of the carrier part 9 are pins 19 that project out of the plane of the carrier part 9 and, together with the shaft 17, form mating aligning elements.

Figure 4:
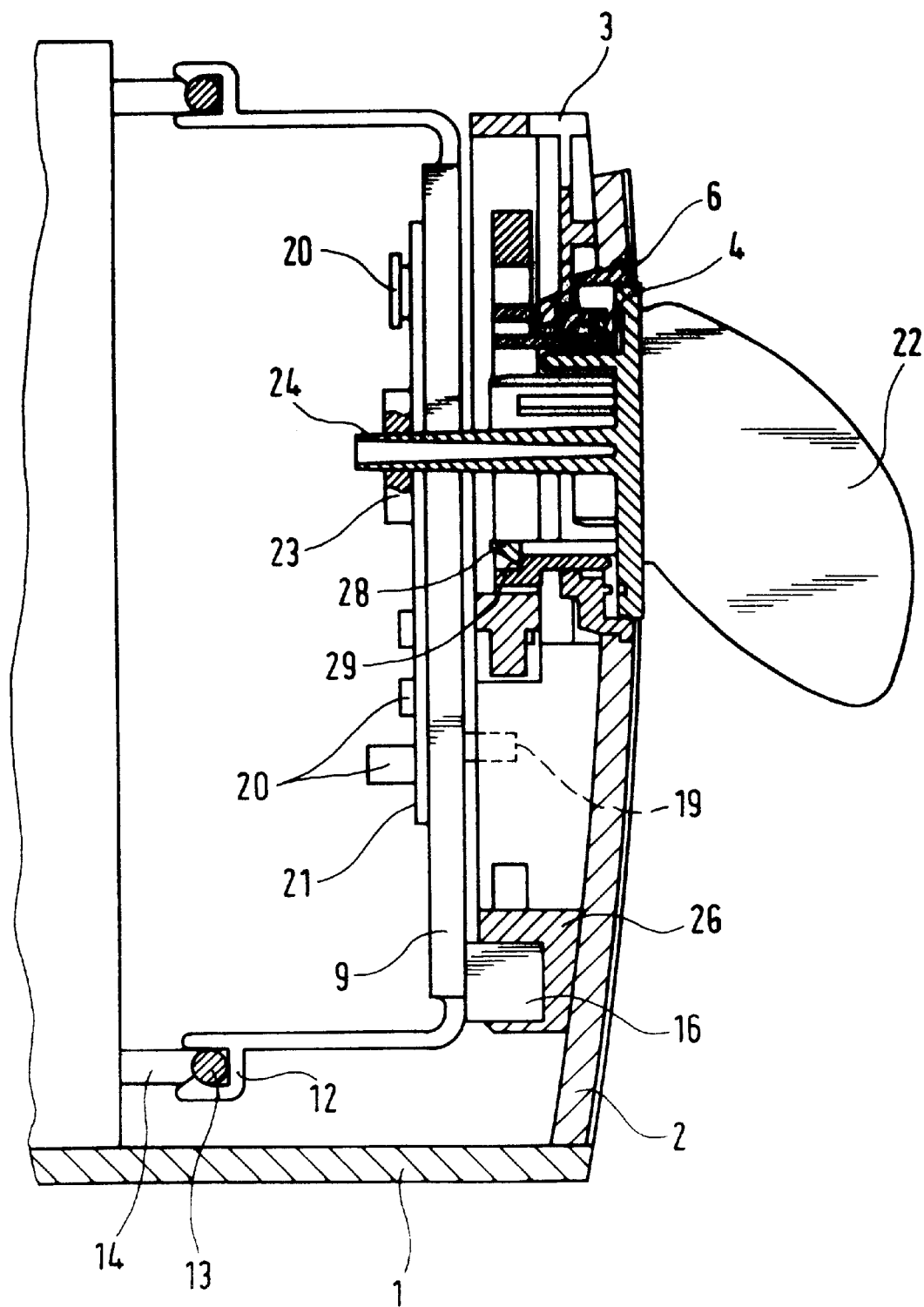
FIG. 4 is a fragmentary, cross-sectional view of the configuration of FIG. 3 in a joined-together state.

Furthermore, a printed circuit board 21 bearing electrical control elements 20 (see FIG. 4) is disposed on the rear side of the carrier part 9. Moreover, a control member 23, which can be actuated by a switching toggle 22 and acts as an on/off switch, is located on the printed circuit board 21. The switching toggle 22 engages by way of its switch pin 24, which has an angular cross-sectional shape, in a plug-in opening 25 of the control member 23, the plug-in opening 25 having a cross-sectional shape corresponding to the cross-sectional shape of the switch pin 24. It is, thus, possible for the control member 23 to be adjusted by corresponding rotary movements of the switching toggle 22. Because the carrier part 9 is secured on the drive motor 11, the electrical connections that are necessary between the drive motor 11 and the control member 23, which is disposed on the printed circuit board 21, as well as the control elements 20 may be produced without difficulty. Production is facilitated, in particular, in that the drive motor 11, which is disposed on the bottom housing part 1, and the carrier part 9 are freely accessible before the top housing part 2 is fitted.

Because the control member 23 is ultimately fitted on the bottom housing part 1 through the carrier part 9 and the drive motor 11, there are usually problems, on account of production inaccuracies, in the task of coupling the switching toggle 22 disposed on the top housing part 22. To avoid such inaccuracy, the aligning element 3 is provided on the top housing part 2 and the corresponding mating aligning elements, namely, the shaft 17 and the pins 19, are provided on the carrier part 9. So that these elements also reliably engage when the top housing part 2 is placed in position on the bottom housing part 1, and the necessary alignment of the parts in relation to one another can, thus, be achieved, the carrying arms 10, which are fitted on the carrier part 9, are configured such that, once the carrying arms 10 have been snap-connected onto the U-shaped hooks 14, the carrier part 9 assumes a position that is somewhat raised in relation to the position that the carrier part 9 has to assume once the top housing part 2 has been placed in position on the bottom housing part 1. When the top housing part 2 is placed in position, the nose 26 of the aligning element 3 comes into contact either directly with the shaft 17 or with the run-in slopes 16 of the latter. In the first-mentioned case, the carrier part 9 is already in the correct position in the horizontal direction. In the last-mentioned case, the carrier part 9, by virtue of the nose 26 sliding along the run-in slopes 16, is displaced horizontally on the U-legs 13 until the nose 26 ends up coinciding with the shaft 17 and can penetrate into the latter. Moreover, when the top housing part 2 is placed in position, the Y-arms 27 of the aligning element 3 are pushed in an arrow-like manner between the pins 19 and come into contact with the latter. Because the carrier part 9, as has already been mentioned, assumes a position, in the preassembled state, which is raised in relation to the position in the fully assembled state of the appliance, the carrier part 9 is forced downward by the Y-arms 27, which come into contact with the pins 19 when the top housing part 2 is placed in position. The carrier part 9 is, thus, also aligned precisely, in terms of height, in the direction of the installation opening 5 of the top housing part 2 by the aligning element 3, which has the Y-arms and is fastened on the installation opening 5.

As a result of such precise alignment of the carrier part 9, which takes place when the top housing part 2 is placed in position, the switching toggle 22 can, then, easily be plugged, by way of its switch pin 24, into the plug-in opening 25 of the control member 23, which is disposed on the carrier part 9. The switching toggle 22 here latches, by way of latching hooks 28 integrally formed thereon, behind an encircling edge 29 provided on the aligning element 3. Fastening the switching toggle 22 directly on the aligning element 3 avoids tolerances that may occur when the aligning element 3 is fitted in the installation opening 5 of the top housing part 2.

As demonstrated, the above-described configuration of a household appliance achieves both easier production of the electrical connections between the control member and the operating element (drive motor) and satisfactory coupling of the actuating element (switching toggle 22) to the control member 23.

We claim:

1. A household appliance, comprising:
   a housing having:
      an outside surface;
      an actuating element disposed on said outside surface;
      at least two housing parts joined together;
      one of said housing parts having a carrier part one of directly and indirectly disposed on said one housing part in a floating manner, said carrier part having a mating aligning element;
      another of said housing parts having:
         a surface defining an installation opening;
         at least one aligning element engaging said mating aligning element when said at least two housing parts are joined together; and
         said at least one aligning element being disposed with respect to said installation opening to mount said actuating element to said at least one aligning element; and
   an electric operating element disposed in said housing and having an electric circuit with a control member connected to and actuated by said actuating element, said control member connected to said carrier part.

2. The household appliance according to claim 1, wherein:
   said at least two housing parts are joined in a joining direction; and
   said carrier part is floatingly fastened to said one housing part to deflect elastically at least in said joining direction.

3. The household appliance according to claim 1, wherein:
   said another housing part is mounted to said one housing part in a plug-on direction; and
   said carrier part is mounted on said one housing part resiliently in said plug-on direction and is displaceable in a direction 90° offset from said plug-on direction.

4. The household appliance according to claim 1, wherein:
   said mating aligning element is a shaft with centering slopes;
   said shaft is aligned with said control member; and
   said at least one aligning element is a nose-shaped strip shaped to fit into said shaft.

5. The household appliance according to claim 1, wherein:
   said mating aligning element is a shaft with centering slopes;
   said shaft is aligned with said control member; and
   said at least one aligning element is a strip shaped to fit into said shaft.

6. The household appliance according to claim 5, wherein:
   said carrier part is disposed along a plane;
   said mating aligning element also has pin-shaped protrusions projecting out of said plane and aligned with respect to said control member; and
   said another housing part has obliquely running, arrow-shaped strips engaging between said pin-shaped protrusions and sliding along said pin-shaped protrusions when said at least two housing parts are joined together.

7. The household appliance according to claim 5, wherein:
   said mating aligning element also has protrusions projecting away from said carrier part and aligned with respect to said control member; and
   said another housing part has arrow-shaped strips running obliquely with respect to said protrusions, engaging between said protrusions, and sliding along said protrusions when said at least two housing parts are joined together.

8. The household appliance according to claim 1, wherein:
said another housing part is mounted to said one housing part in a plug-on direction;
said carrier part has at least three carrying arms resilient in said plug-on direction; and
said at least three carrying arms are fastened to said one housing part displaceable in a direction 90° offset to said plug-on direction.

9. The household appliance according to claim 1, wherein:
said electric circuit has a printed circuit board with said control member; and
said control member is fitted onto said carrier part.

10. The household appliance according to claim 9, wherein:
said electric operating element is a drive motor fitted on said one housing part and having an outside surface; and
said carrier part is disposed at said outside surface of said drive motor.

11. The appliance according to claim 1, wherein said electric operating element is one of the group consisting of a motor and heating coils.

12. The household appliance according to claim 1, wherein said at least one aligning element is separate from said another housing part and is aligned in a position at said another housing part with said installation opening for receiving said actuating element.

13. The household appliance according to claim 12, wherein said at least one aligning element has latching elements retaining said at least one aligning element in said installation opening.

14. The household appliance according to claim 13, wherein:
said at least one aligning element is disposed in said housing; and
said actuating element is directly connected to said at least one aligning element in said installation opening from outside said housing.

15. The household appliance according to claim 14, wherein said actuating element has a latching connection connecting said actuating element to said at least one aligning element.

16. The appliance according to claim 1, wherein said control member is a switch.

17. A food processor, comprising:
a housing having:
an outside surface;
an actuating element disposed on said outside surface;
at least two housing parts joined together;
one of said housing parts having a carrier part one of directly and indirectly disposed on said one housing part in a floating manner, said carrier part having a mating aligning element;
another of said housing parts having:
a surface defining an installation opening;
at least one aligning element engaging said mating aligning element when said at least two housing parts are joined together; and
said at least one aligning element being disposed with respect to said installation opening to mount said actuating element to said at least one aligning element; and
an electric operating element disposed in said housing and having an electric circuit with a control member connected to and actuated by said actuating element, said control member connected to said carrier part.

* * * * *